(12) United States Patent
Tang (10) Patent No.: US 11,343,662 B2
(45) Date of Patent: May 24, 2022

(54) METHOD FOR RESOURCE SELECTION IN D2D COMMUNICATION AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP.. LTD., Guangdong (CN)

( * ) Notice: Subject to any disclaimer, the term of this patent is extended or adjusted under 35 U.S.C. 154(b) by 27 days.

(21) Appl. No.: 16/864,337

(22) Filed: May 1, 2020

(65) Prior Publication Data

US 2020/0260246 A1    Aug. 13, 2020

Related U.S. Application Data

(63) Continuation of application No. PCT/CN2017/109403, filed on Nov. 3, 2017.

(51) Int. Cl.
*H04W 4/70* (2018.01)
*H04B 17/318* (2015.01)
(Continued)

(52) U.S. Cl.
CPC ............ *H04W 4/70* (2018.02); *H04B 17/318* (2015.01); *H04L 5/0082* (2013.01); *H04W 8/24* (2013.01);
(Continued)

(58) Field of Classification Search
CPC ......... H04W 4/70; H04W 8/24; H04W 72/02; H04W 72/0453; H04W 80/08;
(Continued)

(56) References Cited

U.S. PATENT DOCUMENTS

2016/0057604 A1\* 2/2016 Luo ..................... H04W 8/005
370/330
2016/0295624 A1 10/2016 Novlan et al.
(Continued)

FOREIGN PATENT DOCUMENTS

| CN | 102007806 A | 4/2011 |
| CN | 107124770 A | 9/2017 |
| EP | 3661237 A1 | 6/2020 |

OTHER PUBLICATIONS

62475869,Specification (Year: 2017).\*
(Continued)

*Primary Examiner* — Un C Cho
*Assistant Examiner* — Yu-Wen Chang (57) ABSTRACT

The present disclosure discloses a method for resource selection in D2D communication and a terminal device, the method includes: performing, by a physical layer of a first terminal device, sensing in a first resource pool on a first carrier within a time interval [n+T1, n+T2] to obtain a first resource set, and resources in the first resource set can be used for the first terminal device to transmit a target service, where n is a time when the target service arrives, or a time when the first terminal device determines that performing sensing is required, 0≤T1<T2; and reporting, by the physical layer of the first terminal device, information of the first resource set to a higher layer of the first terminal device. Therefore, the terminal device can obtain transmission resources for transmitting the target service when the available resources are insufficient for resource selection.

14 Claims, 4 Drawing Sheets

(51) Int. Cl.
  *H04L 5/00* (2006.01)
  *H04W 8/24* (2009.01)
  *H04W 72/02* (2009.01)
  *H04W 72/04* (2009.01)
  *H04W 80/08* (2009.01)
  *H04W 92/18* (2009.01)

(52) U.S. Cl.
  CPC ....... *H04W 72/02* (2013.01); *H04W 72/0453* (2013.01); *H04W 80/08* (2013.01); *H04W 92/18* (2013.01)

(58) Field of Classification Search
  CPC ... H04W 92/18; H04W 74/0808; H04W 4/40; H04W 72/0493; H04W 72/0446; H04W 72/0413; H04B 17/318; H04L 5/0082
  See application file for complete search history.

(56) References Cited

U.S. PATENT DOCUMENTS

| | | | | |
|---|---|---|---|---|
| 2017/0188391 A1* | 6/2017 | Rajagopal | ......... | H04W 74/0816 |
| 2017/0238321 A1* | 8/2017 | Sartori | .................... | H04W 4/80 |
| | | | | 455/452.1 |
| 2018/0098322 A1* | 4/2018 | Yoon | ................. | H04W 72/0446 |
| 2019/0132832 A1* | 5/2019 | Uchiyama | ............... | H04W 4/40 |
| 2019/0150157 A1* | 5/2019 | Panteleev | ............. | H04W 76/14 |
| | | | | 370/329 |
| 2019/0230643 A1* | 7/2019 | Chae | ..................... | H04W 72/02 |
| 2019/0261387 A1* | 8/2019 | Fodor | .................. | H04W 16/14 |
| 2019/0261414 A1* | 8/2019 | Ron | ...................... | H04W 76/14 |
| 2019/0313279 A1* | 10/2019 | Li | ..................... | H04W 28/0289 |
| 2020/0008030 A1* | 1/2020 | Kim | ......................... | H04L 5/003 |
| 2020/0067610 A1* | 2/2020 | Lee | ......................... | H04W 4/40 |
| 2020/0107297 A1* | 4/2020 | Wang | .................... | H04W 92/18 |
| 2020/0178215 A1* | 6/2020 | Wang | .................... | H04W 72/02 |
| 2020/0178217 A1* | 6/2020 | Huang | .................. | H04W 80/02 |
| 2020/0314803 A1* | 10/2020 | Zhang | ................ | H04W 74/006 |
| 2020/0383094 A1* | 12/2020 | Chae | ....................... | H04W 4/40 |

OTHER PUBLICATIONS

62475868,Specification (Year: 2017).*
International Search Report (ISR) dated May 2, 2018 for Application No. PCT/CN2017/109403.
CATT, 3GPP TSG RAN WG1 Meeting #90bis R1-1717794; Discussion on resource pool sharing between mode 3 and mode 4, Prague, Czechia, Oct. 9-13, 2017.
ITRI, 3GPP TSG RAN WG1 Meeting 90bis R1-1718083; Discussion on Sharing Resource Pool for eNB-Controlled and UE-Autonomous in V2V Communication, Prague, CZ, Oct. 9-13, 2017.
The EESR of corresponding European application No. 17930229.4, dated Sep. 30, 2020.

* cited by examiner

```
A physical layer of a first terminal device performs resource sensing
  in a first resource pool on a first carrier within a time interval
[n + T1, n + T2] to obtain a first resource set. Where, resources in the
 first resource set can be used for the first terminal device to transmit a
    target service, where n is a time when the target service arrives, or
       a time when the first terminal device determines that performing
                    resource sensing is required
```
410

```
The physical layer of the first terminal device reports information
  of the first resource set to a higher layer of the terminal device
```
420

METHOD FOR RESOURCE SELECTION IN D2D COMMUNICATION AND TERMINAL DEVICE

CROSS-REFERENCE TO RELATED APPLICATIONS

This application is a continuation of the International Application No. PCT/CN2017/109403, filed on Nov. 3, 2017, the content of which is incorporated herein by reference in its entirety.

TECHNICAL FIELD

Embodiments of the present disclosure relate to the field of wireless communication, and more particularly, to a method for resource selection in device-to-device (D2D) communication and a terminal device.

BACKGROUND

An Internet of Vehicle or referred as Vehicle-to-Everything (V2X) communication system is a sidelink (SL) transmission technology based on D2D communication. Unlike traditional long term evolution (LTE) systems, in which data is receive or sent through base stations, the Internet of Vehicle system employs a terminal-to-terminal direct communication method, thus it has higher spectrum efficiency and lower transmission delay.

In the version Release-14 of the 3rd generation partnership project (3GPP) protocol, two transmission modes are defined: transmission mode 3 (mode 3) and transmission mode 4 (mode 4). A terminal device using transmission mode 3 and a terminal device using transmission mode 4 transmit data in different resource pools. Resources used by the terminal device using transmission mode 3 are allocated by a base station, and the terminal device transmits data on a sidelink according to the resources allocated by the base station; and the terminal device using transmission mode 4 can autonomously select the transmission resources for the sidelink.

For terminals supporting the new version Release-15 of the 3GPP protocol, these two transmission modes can also be used, and a terminal device using transmission mode 3 and a terminal device using transmission mode 4 can share resource pools. Since the terminal device using transmission mode 3 is connected to the base station, and its transmission resources are allocated by the base station, when the terminal device using transmission mode 3 and the terminal device using transmission mode 4 coexist, it is more necessary to protect the reliability of the terminal device using transmission mode 3. However, this may lead to a situation that the terminal device using transmission mode 4 has insufficient available resources.

SUMMARY

The embodiments of the present disclosure provide a method for resource selection in D2D communication and a terminal device, which enable, under the condition that resource requirements of the terminal devices are satisfied, terminal devices using different transmission modes to select appropriate transmission resources for performing data transmission and reduce interference.

In a first aspect, a method for resource selection in D2D communication is provided, including: performing, by a physical layer of a first terminal device, sensing in a first resource pool on a first carrier within a time interval $[n+T1, n+T2]$ to obtain a first resource set, and resources in the first resource set can be used for the first terminal device to transmit a target service, where n is a time when the target service arrives, or a time when the first terminal device determines that performing sensing is required, $0 \leq T1 < T2$; and reporting, by the physical layer of the first terminal device, information of the first resource set to a higher layer of the first terminal device.

Therefore, the physical layer of the terminal device reports the first resource set that it determined available for transmitting the target service to the higher layer, so that the higher layer of the terminal device can allocate resources to the terminal device or indicate it to perform operations such as resource reselection and the like based on the report of the physical layer, thereby the terminal device can also obtain transmission resources for transmitting the target service when the available resources are insufficient for resource selection.

In a possible implementation, the performing, by a physical layer of a first terminal device, sensing in a first resource pool on a first carrier within a time interval $[n+T1, n+T2]$ to obtain a first resource set includes:

performing, by the physical layer of the first terminal device, sensing in the first resource pool within the time interval $[n+T1, n+T2]$ to obtain a second resource set, wherein the total amount of resources in the first resource pool on the first carrier within the time interval $[n+T1, n+T2]$ is A, and the amount of resources in the second resource set is B;

performing, by the physical layer of the first terminal device, detection on received signal strength indicator RSSI of B resources in the second resource set if B/A is greater than or equal to a threshold Q, and taking P resources with smallest RSSI measurement value in the second resource set as the first resource set; and determining, by the physical layer of the first terminal device, the second resource set as the first resource set if B/A is lower than the threshold Q.

In a possible implementation, the second resource set does not comprise resources occupied and/or reserved by a second terminal device, wherein the second terminal device is a terminal device using a first transmission mode, and the first terminal device is a terminal device using a second transmission mode.

In a possible implementation, P is determined according to Q and A. For example, $P = \lceil Q \times A \rceil$, $P = \lfloor Q \times A \rfloor$, or $P = \text{round}(Q \times A)$, where $\lceil \, \rceil$ is rounding up to an integer, $\lfloor \, \rfloor$ is rounding down to an integer, and round ( ) is rounding off.

Therefore, since the physical layer of the first terminal device using the second transmission mode excludes resources occupied and/or reserved by the second terminal device using the first transmission mode, thereby when the first terminal device performs the resource selection, it does not affect the data transmission of the second terminal device using the first transmission mode.

In a possible implementation, time-frequency resources used by the terminal device using the first transmission mode for service transmission are resources scheduled by a network device; time-frequency resources used by the terminal device using the second transmission mode for service transmission are resources that the terminal device using the second transmission mode autonomously selects in a resource pool corresponding to the second transmission mode.

The first transmission mode may be, for example, transmission mode 3 in the Release-14 of the 3GPP protocol.

When the terminal device uses the first transmission mode, the time-frequency resources used by the terminal device for performing the data transmission are resources scheduled by the network device. The second transmission mode may be, for example, transmission mode 4 in the Release-14 of the foregoing 3GPP protocol. When the terminal device uses the second transmission mode, the time-frequency resources are resources that the terminal device can autonomously select, such as resources randomly selected in the corresponding resource pool, or resources determined by the terminal device based on results of sensing.

Since the transmission resources of the terminal device using transmission mode 3 are allocated by the base station, when the terminal devices using transmission mode 3 and transmission mode 4 transmit by sharing the resource pool, the physical layer of the terminal device using transmission mode 4 excludes the resources occupied and/or reserved by the terminal device using transmission mode 3, and reports information of a remaining resource set to its higher layer. Thereby, while the terminal device using transmission mode 4 performs resource selection, it also ensures normal transmission of the terminal device using transmission mode 3.

In a possible implementation, the reporting, by the physical layer of the first terminal device, information of the first resource set to a higher layer of the first terminal device, includes: reporting, by the physical layer of the first terminal device, resources in the first resource set to the higher layer of the first terminal device.

In a possible implementation, the reporting, by the physical layer of the first terminal device, information of the first resource set to a higher layer of the first terminal device, includes: reporting, by the physical layer of the first terminal device, an insufficient resource indication to the higher layer of the first terminal device, where the insufficient resource indication is used to indicate that a ratio of B and A is lower than the threshold Q, where B is the amount of resources in the second resource set, and A is the total amount of resources in the first resource pool on the first carrier within the time interval [n+T1, n+T2].

In a possible implementation, the method further includes: determining, by the higher layer of the first terminal device, in the first resource set, a target resource for the first terminal device to transmit the target service; sending, by the higher layer of the first terminal device, a first indication to the physical layer of the first terminal device, and the first indication is used to indicate the target resource; and transmitting, by the physical layer of the first terminal device, the target service on the target resource according to the first indication.

In a possible implementation, the method further includes: sending, by the higher layer of the first terminal device, a second indication to the physical layer of the first terminal device, and the second indication is used to indicate that the physical layer of the first terminal device reselects a first resource set available for transmitting the target service in a second resource pool on the first carrier.

In a possible implementation, the method further includes: sending, by the higher layer of the first terminal device, a third indication to the physical layer of the first terminal device, and the third indication is used to indicate that the physical layer of the first terminal device reselects a first resource set available for transmitting the target service in a third resource pool on a second carrier In a possible implementation, before the performing, by the physical layer of the first terminal device, sensing in the first resource pool within the time interval [n+T1, n+T2] to obtain a second resource set, the method further includes: receiving, by the first terminal device, configuration information sent by a network device, and the configuration information is used to indicate the threshold Q; or acquiring, by the first terminal device, the threshold Q pre-stored in the first terminal device.

In a second aspect, a terminal device is provided, and the terminal device can perform operations of the terminal device in the first aspect or any optional implementation of the first aspect described above. Specifically, the terminal device may include module units for performing the operations of the terminal device in the first aspect or any possible implementation of the first aspect described above.

In a third aspect, a terminal device is provided. The terminal device includes a processor, a transceiver, and a memory. Where, the processor, the transceiver, and the memory communicate with each other through an internal connection path. The memory is configured to store instructions, and the processor is configured to execute instructions stored in the memory. When the processor executes the instructions stored in the memory, the execution causes the terminal device to execute the methods in the first aspect or any possible implementation of the first aspect, or the execution causes the terminal device to implement the terminal device provided in the second aspect.

In a fourth aspect, a computer readable storage medium is provided. The computer readable storage medium stores programs that cause a terminal device to perform the methods for resource selection in D2D communication of the first aspect and any of various implementations described above.

In a fifth aspect, a system chip is provided. The system chip includes an input interface, an output interface, a processor, and a memory. The processor is configured to execute instructions stored in the memory. When the instructions are executed, the processor may implement the methods in the foregoing first aspect or any possible implementation of the first aspect.

In a sixth aspect, a computer program product including instructions is provided, and when the computer program product runs on a computer, the computer is caused to execute the methods in the foregoing first aspect or any possible implementation of the first aspect.

DESCRIPTION OF EMBODIMENTS

The technical solutions in the embodiments of the present disclosure will be described below with reference to the drawings.

It should be understood that the technical solutions in the embodiments of the present disclosure can be applied to various communication systems, such as: a global system of mobile communication (GSM) system, a code division multiple access (CDMA) system, a wideband code division multiple access (WCDMA) system, a long term evolution (LTE) system, an LTE frequency division duplex (FDD) system, an LTE time division duplex (TDD) system, a universal mobile telecommunication system (UMTS), and a future 5G communication system.

The present disclosure describes various embodiments in combination with a terminal device. The terminal device can also refer to a user equipment (UE), an access terminal, a user unit, a user station, a mobile station, a mobile site, a remote station, a remote terminal, a mobile device, a user terminal, a terminal, a wireless communication device, a user agent or a user device. The access terminal can be a cell phone, a cordless phone, a session initiation protocol (SIP) phone, a wireless local loop (WLL) station, a personal digital assistant (PDA), a handheld device with wireless communication function, a computing device or other processing devices connected to wireless modems, a vehicle device, a wearable device, a terminal device in a future 5G network or a terminal device in a future evolved public land mobile network (PLMN) network, or the like.

The present disclosure describes various embodiments in combination with a network device. The network device may be a device for communicating with a terminal device. For example, it may be a base station (Base Transceiver Station, BTS) in a GSM system or CDMA system, or a base station (NodeB, NB) in a WCDMA system, or it may also be an evolutional node B (eNB or eNodeB) in an LTE system, or the network device may be a relay station, an access point, a vehicle device, a wearable device, and a network-side device in a future 5G network or a network-side device in a future evolved PLMN network, or the like.

Figure 1:
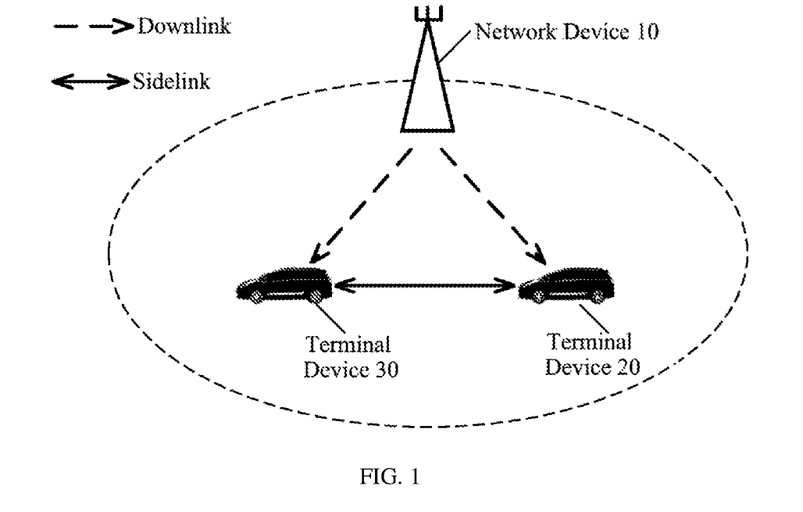
FIG. 1 is a schematic architecture diagram of an application scenario according to an embodiment of the present disclosure.
Figure 2:
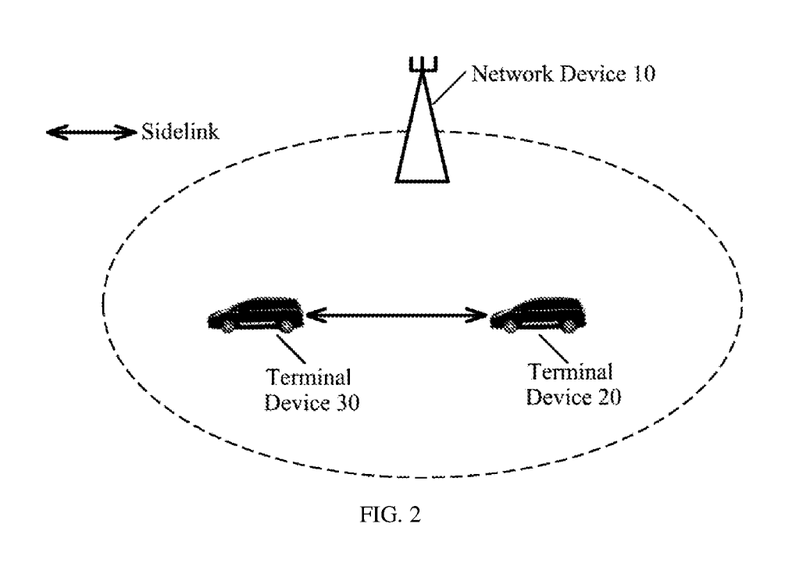
FIG. 2 is a schematic architecture diagram of another application scenario according to an embodiment of the present disclosure.

FIG. 1 and FIG. 2 are schematic diagrams of two application scenarios according to embodiments of the present disclosure. FIG. 1 exemplarily shows one network device and two terminal devices. The wireless communication system may include multiple network devices and the amount of terminal devices exist in the coverage of each network device may be different from two. The embodiments of the present disclosure do not limit thereto. In addition, the wireless communication system may also include other network entities such as a mobile management entity (MME), a serving gateway (S-GW), a packet data network gateway (P-GW), and the like, but the embodiments of the present disclosure do not limited thereto.

Specifically, a terminal device 20 and a terminal device 30 can communicate in a D2D communication mode. During the D2D communication, the terminal device 20 and the terminal device 30 directly communicate with each other through a D2D link, i.e., a sidelink (SL). For example, as shown in FIG. 1 or FIG. 2, the terminal device 20 and the terminal device 30 directly communicate with each other through a sidelink. In FIG. 1, the terminal device 20 communicates with the terminal device 30 through a sidelink, and transmission resources are allocated by the network device; in FIG. 2, the terminal device 20 communicates with the terminal device 30 through a sidelink, transmission resources are autonomously selected by the terminal device, and no network device is required to allocate transmission resources.

D2D communication may refer to Vehicle to Vehicle (V2V) communication or Vehicle to Everything (V2X) communication. In the V2X communication, X may widely refer to any device with wireless receiving and sending capabilities, for example, but not limited to, slow moving wireless apparatus, fast moving vehicle devices, or network control nodes with wireless transmitting and receiving capabilities. It should be understood that the embodiments of the present disclosure are mainly applied to the scenarios of V2X communication, but can also be applied to any other D2D communication scenarios, which the embodiments of the present disclosure do not limit thereto.

In an Internet of Vehicle system, there may be two types of terminal devices, that is, the terminal devices with sensing capability such as Vehicle User Equipment (VUE) or Pedestrian User Equipment (PUE), and the terminal devices without sensing capability such as a PUE. VUE has higher processing capability and is usually powered by a battery in a vehicle. PUE has lower processing capability, reducing power consumption is also a major factor that PUE needs to consider. Therefore, in an existing Internet of Vehicle system, VUE is considered to have complete receiving and sensing capabilities; while PUE is considered to have partial or no receiving and sensing capabilities. If PUE has part of the sensing capability, its selection of resources can employ a sensing method similar to VUE, and selection of available resources is performed on the part of the resources that can be sensed; if PUE does not have the sensing capability, then PUE randomly selects transmission resources in a resource pool.

In the version Release-14 of the 3GPP protocol, two transmission modes are defined, that is, transmission mode 3 (mode 3) and transmission mode 4 (mode 4). Transmission resources of a terminal device using transmission mode 3 are allocated by a base station, and the terminal device sends data on a sidelink according to the resources allocated by the base station; the base station can allocate resources for a single transmission for the terminal device, or allocate resources for semi-static transmission for the terminal device. If a terminal device using transmission mode 4 has the sensing capability, it transmits data by means of sensing and reservation. If it does not have the sensing capability, it randomly selects transmission resources in a resource pool. A terminal device with the sensing capability acquires an available resource set from a resource pool by means of sensing, and the terminal device randomly selects a resource from the set to perform data transmission. Since services in the Internet of Vehicle system is periodical, the terminal device usually adopts semi-static transmission, that is, after selecting a transmission resource, the terminal device will continuously use this resource in multiple transmission periods, thereby reducing the probability of resource reselection and resource conflicts. In the control information transmitted by the terminal device in one time, the information of resources reserved for the next transmission is carried, so that other terminal devices can determine whether this resource is reserved and used by the terminal device through detecting the control information of the terminal device, thus achieving a purpose of reducing resource conflicts.

In the version Release-14 of the 3GPP protocol, a resource pool corresponding to transmission mode 3 and a resource pool corresponding to transmission mode 4 are orthogonal. A terminal device using mode 3 performs data transmission on time-frequency resources in a resource pool supporting mode 3, and a terminal device using mode 4 performs data transmission on time-frequency resources in a resource pool supporting mode 4.

In the new version Release-15 of the 3GPP protocol, in order to improve resource utilization, a terminal device using transmission mode 3 and a terminal device using transmission mode 4 can share a resource pool. At this time, a terminal device with the sensing capability can select resources through sensing, and for a terminal device without the sensing capability, it is inevitable to cause interference with data transmission of other terminal devices. Since the terminal device using transmission mode 3 is connected to a base station, and its transmission resources are allocated by the base station, when the terminal device using transmission mode 3 and the terminal device using transmission mode 4 coexist, it is more necessary to protect the transmission reliability of the terminal device using transmission mode 3.

When the terminal device using transmission mode 4 is sensing resources, processes of sensing and selection in the Internet of Vehicle system of the Release-14 version can be performed. The processes of sensing and selection are exemplarily described below.

Figure 3:
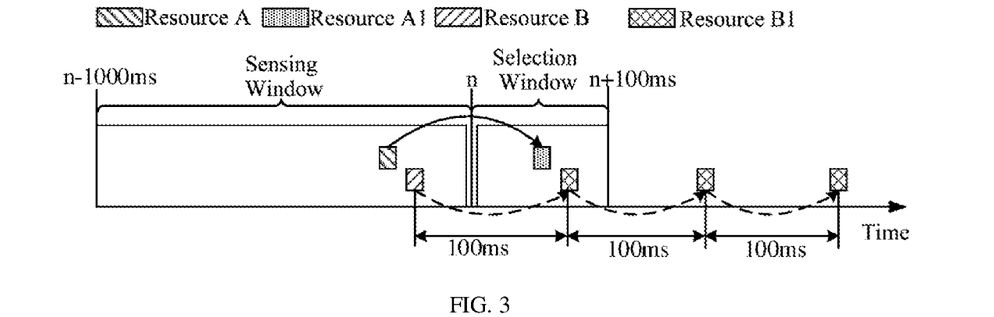
FIG. 3 is a schematic diagram of sensing and selection.

As shown in FIG. 3, in each sidelink process (one carrier may include two processes), when a new data packet arrives around time n, performing resource selection or resource reselection is required. The terminal device performs resource selection within a time interval [n+T1, n+T2] ms according to a sensing result of a sensing window in the last 1s (i.e. 1000 ms). The time period [n+T1, n+T2] ms is called a selection window, where T1 and T2 may satisfy T1≤4, 20≤T2≤100, for example. The last 1s described later indicates the 1s before the time n. The specific processes of resource selection are as follows. Here, taking the terminal device 20 sensing resources of the terminal device 30 as an example for description:

(0) It is assumed that all resources in the selection window constitute a candidate resource set S_A, and it is assumed that the amount of resources in an initial candidate resource set S_A is A.

(1) If there is no sensing result on a certain subframe within the sensing window, and another subframe which is reserved and distributed according to a certain transmission period with the subframe falls in the selection window, then resources on the said another subframe in the selection window are excluded from the candidate resource set S_A. The transmission period may be an element in a transmission period set, and the transmission period set may be, for example, {20, 50, 100, 200, 300, 400, 500, 600, 700, 800, 900, 1000} ms. For example, as shown in FIG. 3, if the terminal device 20 does not have a sensing result on a resource A in the sensing window, and a resource on a next transmission period corresponding to the resource A is a resource A1 in the selection window, then the terminal device 20 excludes the resource A1 from the candidate resource set S_A.

(2) If the terminal device 20 has detected a physical sidelink control channel (PSCCH) sent by the terminal device 30 in the sensing window of the last 1s, and a measured value of reference signal received power (RSRP) of a physical sidelink shared channel (PSSCH) corresponding to the PSCCH is higher than a PSSCH-RSRP threshold, and the detected PSCCH indicates that the terminal device 30 sending the PSCCH reserves time-frequency resources required for the follow-up transmission (for example, in FIG. 3, the time-frequency resource reserved by the terminal device 30 is a time-frequency resource B1 which corresponds to the resource B in the sensing window and locates at time domain positions such as 100 ms, 200 ms, 300 ms, . . . after the resource B), then the terminal device 20 determines whether the time-frequency resources reserved by the terminal device 30 in the selection window overlaps (including all overlapping or partially overlapping) with the time-frequency resources for transmitting data selected by itself in the selection window. If they overlap, that is, a resource conflict occurs, then the terminal device 20 excludes the time-frequency resources in the selection window from the candidate resource set S_A. At this time, it is assumed that the amount of remaining resources in the candidate resource set S_A is B.

It should be understood that if the terminal device 20 selects the time-frequency resources for transmitting data for itself in the selection window, and needs to transmit data on multiple time-frequency resources distributed according to a time period T20, then at this time, if the terminal device 30 reserves multiple time-frequency resources distributed according to a time period T30, and the time period T20 satisfies T20×M=T30×N, M and N are positive integers, then the terminal device 20 will exclude the multiple time-frequency resources distributed according to a time period T20 from the candidate resource set.

(3) If B, which is the amount of remaining resources in the candidate resource set S_A, is less than A×20%, the terminal device 20 may increase the PSSCH-RSRP threshold by 3 dB, and repeat steps (0) to (2) until B≥A×20%.

(4) The terminal device 20 performs measurement of Received Signal Strength Indicator (RSSI) for the remaining B resources in the candidate resource set S_A, and sorts measurement results from high to low, and moves A×20% resources with lowest signal strength to a candidate resource set S_B.

(5) The terminal device 20 selects, with equal probability, a time-frequency resource from the candidate resource set S_B for data transmission.

It should be understood that a time-frequency resource occupied by a data channel corresponding to a certain control channel is referred to here as a time-frequency resource (or a resource block) used to transmit the data channel. In the candidate resource set in each selection window, there may be multiple time-frequency resources for transmitting the data channel. For example, the resources µl and B1 in FIG. 3 may both be referred to as a time-frequency resource.

After the terminal device 20 selects the time-frequency resource for data transmission, it will continue to use the time-frequency resource in each transmission period of the subsequent transmission process, using the time-frequency resource C_resel times in total, where C_resel is a Resource Reselection Counter. Each time data is transmitted, the value of C_resel is decremented by 1. When the value of C_resel is reduced to 0, the terminal device 20 will generate a random number between [0, 1], which will be compared with a Probability Resource Keep (ProbResourceKeep) parameter. This parameter denotes a probability that the terminal device continues to use this resource. If the value of the random number is greater than the parameter, the terminal device 20 performs resource reselection. If the value of the random number is lower than the parameter, the terminal device 20 may continue to use this time-frequency resource to perform data transmission, and at the same time reset the value of C_resel.

In the above step (4), the terminal device 20 needs to select A×20% resources with the lowest RSSI measurement value from the remaining B resources in the candidate resource set S_A and moves them to the candidate resource set S_B. However, if the PSSCH-RSRP threshold has been increased to a maximum value, and it is still that B<A×20%, that is, it is not enough to select these A×20% resources among the remaining B resources in the candidate resource set S_A, then the terminal device cannot find the transmission resources for transmitting the current data.

For this reason, in the embodiments of the present disclosure, in the case that the available resources are insufficient for resource selection, the physical layer of the terminal device reports the first resource set that it currently determines available for transmitting the target service to the higher layer, so that the higher layer of the terminal device can allocate resources to the terminal device or indicate it to perform operations such as resource reselection and the like based on the report of the physical layer, thereby enabling the terminal device to obtain transmission resources for transmitting the target service. In addition, the reliability of data transmission of the terminal devices using different transmission modes can be guaranteed.

It should be understood that in the embodiments of the present disclosure, operations performed by the physical layer of the terminal device (hereinafter also referred to simply as the physical layer) may be understood as operations performed on the physical layer by the terminal device, or operations performed by a physical layer module of the terminal device; operations performed by the higher layer (hereinafter also referred to as the higher layer) of the terminal device may be understood as operations performed on the higher layer by the terminal device or operations performed by a higher layer module of the terminal device.

Figure 4:
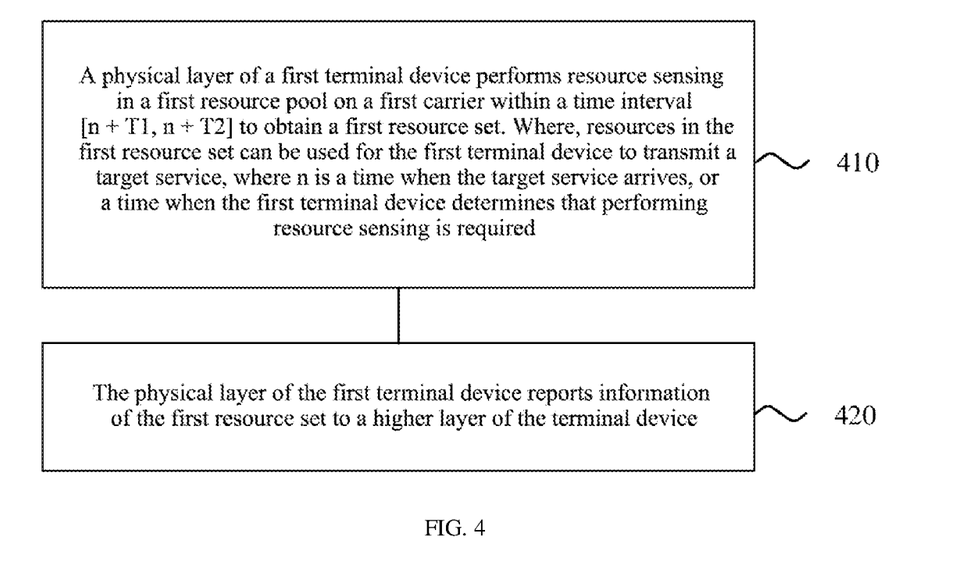
FIG. 4 is a schematic flowchart of a method for resource selection according to an embodiment of the present disclosure.

FIG. 4 is a schematic flowchart of a method for resource selection in D2D communication according to an embodiment of the present disclosure. The method shown in FIG. 4 may be executed by a first terminal device, and the first terminal device may be, for example, the terminal device 20 or the terminal device 30 shown in FIG. 2. As shown in FIG. 4, the method for resource selection in D2D communication includes:

In 410, a physical layer of the first terminal device performs sensing in a first resource pool on a first carrier within a time interval [n+T1, n+T2] to obtain a first resource set.

Resources in the first resource set can be used for the first terminal device to transmit a target service, where n is a time when the target service arrives, or a time when the first terminal device determines that performing sensing is required, $0 \leq T1 < T2$.

Where, T1 and T2 may be configured by a network device for the first terminal device, or may be pre-stored in the first terminal device, or may be self-selected by the first terminal device in some way, which is not limited here. For example, $0 \leq T1 \leq D1$, $D2 \leq T2 \leq D3$, D1, D2, and D3 are parameters predefined by the system or configured by the network device, and $D3 \leq D$ represents a delay requirement of the target service.

In 420, the physical layer of the first terminal device reports information of the first resource set to a higher layer of the terminal device.

Specifically, the physical layer of the first terminal device listens resources within the time interval [n+T1, n+T2] in the first resource pool on the first carrier, so as to determine the first resource set that can be used to transmit the target service. Where, n is the time when the target service arrives, or n is the time when the first terminal device determines that performing sensing is required. For example, if the target service arrives before the time n, the physical layer of the first terminal device may receive a request sent by its higher layer at the time n, thus the physical layer of the first terminal device determines at the time n that performing sensing within the time interval [n+T1, n+T2] is required, so as to find transmission resources for the target service.

Figure 5:
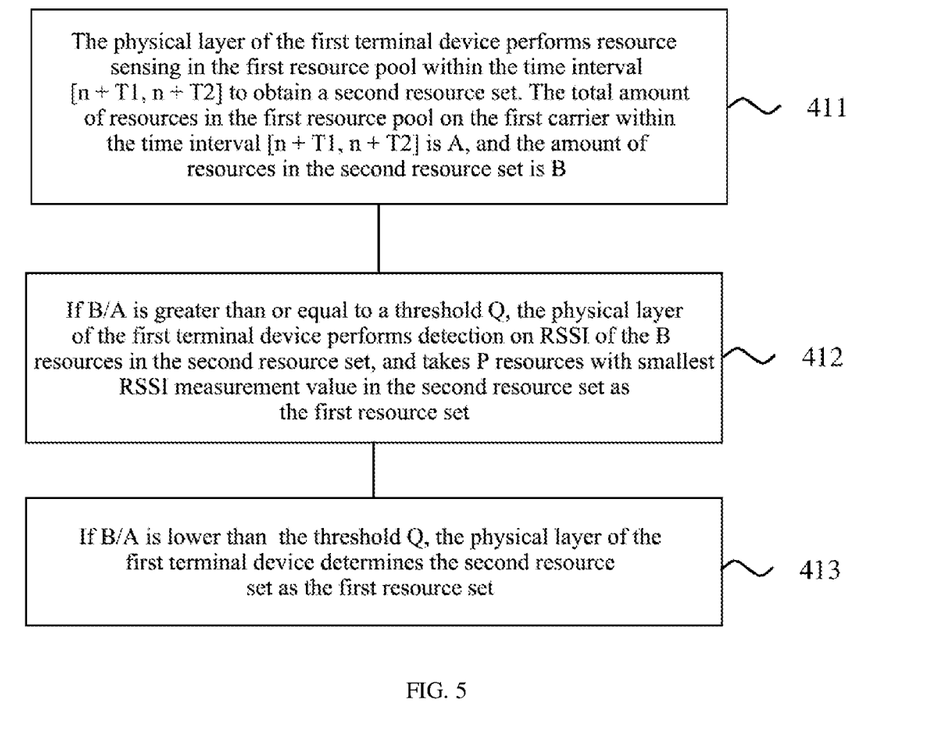
FIG. 5 is a schematic flowchart of a method for acquiring a first resource set according to an embodiment of the present disclosure.

In an embodiment, as shown in FIG. 5, 410 may further include 411 to 413. Where:

In 411, the physical layer of the first terminal device performs sensing in the first resource pool within the time interval [n+T1, n+T2] to obtain a second resource set.

The total amount of resources in the first resource pool on the first carrier within the time interval [n+T1, n+T2] is A, and the amount of resources in the second resource set is B.

In an embodiment, the second resource set does not include resources occupied and/or reserved by a second terminal device, the second terminal device is a terminal device using a first transmission mode, and the first terminal device is a terminal device using a second transmission mode.

For example, when the first terminal device detects a PSCCH of the second terminal device in the first resource pool, the resources occupied by a PSSCH scheduled by the PSCCH and the reserved resources indicated by the PSCCH are excluded from the second resource set.

Therefore, since the physical layer of the first terminal device using the second transmission mode excludes the resources occupied and/or reserved by the second terminal device using the first transmission mode, and report information of the remaining resource set to the higher layer, the data transmission of the second terminal device using the first transmission mode will not be affected.

In an embodiment, the time-frequency resources used by the terminal device using the first transmission mode for performing service transmission are resources scheduled by the network device, and the time-frequency resources used by the terminal device using the second transmission mode for performing service transmission are resources selected autonomously by the terminal device from a resource pool corresponding to the second transmission mode.

The first transmission mode may be, for example, transmission mode 3 in the Release-14 of the foregoing 3GPP protocol. When the terminal device uses the first transmission mode, the time-frequency resources used by the terminal device for performing the data transmission are resources scheduled by the network device. The second transmission mode may be, for example, transmission mode 4 in the Release-14 of the foregoing 3GPP protocol. When the terminal device uses the second transmission mode, the time-frequency resources are resources that the terminal device can autonomously select, such as resources randomly selected in a corresponding resource pool, or resources determined by the terminal device based on the results of sensing.

Since the transmission resources of the terminal device using transmission mode 3 are allocated by the base station, when the terminal devices using transmission mode 3 and transmission mode 4 transmit by sharing the resource pool, the physical layer of the terminal device using transmission mode 4 excludes the resources occupied and/or reserved by the terminal device using transmission mode 3, thereby guaranteeing the normal transmission of the terminal device using transmission mode 3 while the terminal device using transmission mode 4 performs resource selection.

In 412, if B/A is greater than or equal to a threshold Q, the physical layer of the first terminal device performs detection on RSSI of the B resources in the second resource set, and takes P resources with smallest RSSI measurement value in the second resource set as the first resource set.

In 413, if B/A is lower than the threshold Q, the physical layer of the first terminal device determines the second resource set as the first resource set.

In an embodiment, P is determined based on Q and A. For example, $P=\lceil Q \times A \rceil$, $P=\lfloor Q \times A \rfloor$, or $P=\text{round}(Q \times A)$, where $\lceil\ \rceil$ is rounding up to an integer, $\lfloor\ \rfloor$ is rounding down to an integer, and round ( ) is rounding off.

In this embodiment, within the time interval [n+T1, n+T2], the physical layer of the first terminal device using the second transmission mode performs sensing in the first resource pool configured by the network device for the terminal device using the second transmission mode, to obtain the second resource set. When the first terminal device using the second transmission mode performs sensing in the first resource pool, it will exclude the resources occupied and/or reserved by the second terminal device using the first transmission mode, so that data transmission of the second terminal device using the first transmission mode is guaranteed.

It should be understood that in the embodiments of the present disclosure, the total amount of resources of the first resource pool within the time interval [n+T1, n+T2] is A, and the first terminal device needs to exclude the resources occupied and/or reserved by the second terminal device among the A resources, and at the same time, other unavailable resources are also excluded, for example, resources that the PSSCH-RSRP measurement value is greater than the PSSCH-RSRP threshold and are occupied and/or reserved by other first terminal devices are excluded from the A resources, thereby obtaining the second resource set. The amount of resources in the second resource set is B, and the B resources are resources that can be used by the first terminal device to transmit the target service. In other words, B, which is the amount of resources in the second resource set, is equivalent to the amount of resources in the candidate resource set S_B obtained in step (4) in the description of FIG. 3.

The physical layer of the first terminal device performs sensing in the first resource pool within the time interval [n+T1, n+T2] and obtains the second resource set. The B resources in the second resource set may be, for example, the second resource set obtained by the first terminal device through sensing after the PSSCH-RSRP threshold has reached a maximum value (such as infinity). When the PSSCH-RSRP threshold is already infinite, it can be considered that the first terminal device will not exclude resources occupied and/or reserved by other first terminal devices from the A resources. Even in this case, if B, which is the amount of resources in the second resource set, is still less than P, the physical layer of the first terminal device may directly determine the second resource set as the first resource set.

If B/A is greater than or equal to the threshold Q, the physical layer of the first terminal device performs detection on the received signal strength indicator RSSI of the B resources in the second resource set, and takes P resources with smallest RSSI measurement value in the second resource set as the first resource set. In other words, if B, which is the amount of resources in the second resource set, is greater than P, the physical layer of the first terminal device uses the P resources with the smallest RSSI measurement value in the B resources as the first resource set, and reports relevant information of the first resource set to the higher layer of the first terminal device. At this time, the amount of resources in the first resource set is P.

If B/A is lower than the threshold Q, the physical layer of the first terminal device may directly determine the second resource set as the first resource set. When B/A is lower than the threshold Q, it means that B, which is the amount of resources in the second resource set, is less than P. Then, B, the amount of resources in the second resource set, is not enough for performing resource selection based on RSSI measurement values, and P resources cannot be selected, then, at this time, the physical layer of the first terminal device may directly determine the B resources in the second resource set as the first resource set, and report relevant information of the first resource set to the higher layer. At this time, the amount of resources in the first resource set is B instead of P.

In an embodiment, before 410, that is, before the physical layer of the first terminal device performing sensing in the first resource pool within the time interval [n+T1, n+T2] to obtain a second resource set, the method further includes: the first terminal device receives configuration information sent by the network device, the configuration information is used to indicate the threshold Q; or the first terminal device acquires the threshold Q pre-stored in the first terminal device.

That is, the threshold Q may be configured by the network device to the first terminal device, or is a threshold agreed in advance by the network device and the first terminal device, for example, specified in a protocol.

After obtaining the first resource set, the physical layer of the first terminal device reports the information of the first resource set to the higher layer. The information of the first resource set may specifically be resources in the first resource set, and/or an indication used to indicate that resources in the first resource set is insufficient.

In an embodiment, in 420, the reporting, by the physical layer of the first terminal device, the information of the first resource set to the higher layer of the terminal device, includes: the physical layer of the first terminal device reports resources in the first resource set to the higher layer of the terminal device.

In an embodiment, in 420, the reporting, by the physical layer of the first terminal device, the information of the first resource set to the higher layer of the terminal device, includes: the physical layer of the first terminal device reports an insufficient resource indication to the higher layer of the first terminal device, which is used to indicate a ratio of B and A is lower than the threshold Q, where B is the amount of resources in the second resource set and A is the total amount of resources in the first resource pool on the first carrier within the time interval [n+T1, n+T2].

The physical layer of the first terminal device indicates B/A<Q to the higher layer of the first terminal device through the insufficient resource indication. It can also be understood that the insufficient resource indication indicates that the amount of resources in the first resource set reported by the physical layer is insufficient.

After the physical layer of the first terminal device reports the resources and/or the insufficient resource indication of the first resource set to the higher layer, the higher layer may instruct the physical layer to perform resource selection in the following ways:

In an embodiment, after 420, the method further includes: the higher layer of the first terminal device determines, in the first resource set, a target resource for the first terminal device to transmit the target service; the higher layer of the first terminal device sends a first indication to the physical layer of the first terminal device, where the first indication is used to indicate the target resource; and the physical layer of the first terminal device transmits the target service on the target resource according to the first indication.

In an embodiment, after 420, the method further includes: the higher layer of the first terminal device sends a second indication to the physical layer of the first terminal device, where the second indication is used to indicate that the physical layer of the first terminal device reselects a first resource set available for transmitting the target service in a second resource pool on the first carrier.

In an embodiment, after 420, the method further includes: the higher layer of the first terminal device sends a third indication to the physical layer of the first terminal device, where the third indication is used to indicate that the physical layer of the first terminal device reselects a first resource set available for transmitting the target service in a third resource pool on a second carrier.

Specifically, after receiving the information of the first resource set, the higher layer of the first terminal device may select a suitable transmission resource (that is, the target resource) in the first resource set for the target service, and send the target resource to the physical layer, so that the physical layer transmits the target service on the target resource. If the higher layer of the first terminal device receives only the insufficient resource indication, the higher layer may also transmit an indication to indicate the physical layer to reselect a first resource set available for transmitting the target service in other resource pools on the first carrier; or, when multi-carrier transmission is supported, the higher layer may also indicate the physical layer to reselect a first resource set available for transmitting the target service in other resource pools on other carriers.

Therefore, in the embodiments of the present disclosure, the physical layer of the terminal device reports the determined first resource set for transmitting the target service to the high layer, so that the higher layer of the terminal device can allocate resources to the terminal device or indicate it to perform operations such as resource reselection based on the report of the physical layer, thereby enabling the terminal device to obtain transmission resources for transmitting the target service when the available resources are not sufficient for resource selection.

It should be understood that, in the various embodiments of the present disclosure, the order of the sequence numbers of the above processes does not mean an order of an execution sequence, and the execution sequence of each process should be determined by its function and internal logic, and should not constitute any limitation to the implementation of the embodiments of the present disclosure.

The method for resource selection in D2D communication according to the embodiment of the present disclosure is described in detail above. Devices according to the embodiments of the present disclosure are described below with reference to FIG. 6 to FIG. 8, and the technical features described in the method embodiments are applicable to the following device examples.

Figure 6:
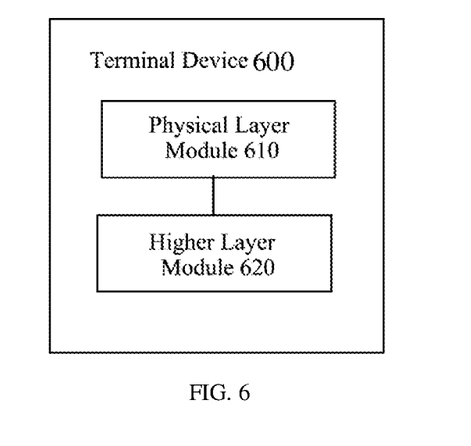
FIG. 6 is a schematic block diagram of a terminal device according to an embodiment of the present disclosure.

FIG. 6 is a schematic block diagram of a terminal device 600 according to an embodiment of the present disclosure. As shown in FIG. 6, the terminal device 600 is a first terminal device, and the first terminal device 600 includes a physical layer module 610 and a higher layer module 620. Where:

the physical layer module 610, configured to perform sensing in a first resource pool on a first carrier within a time interval [n+T1, n+T2] to obtain a first resource set, and resources in the first resource set can be used for the first terminal device to transmit a target service, where n is a time when the target service arrives, or a time when the first terminal device determines that performing sensing is required, 0≤T1<T2; and the physical layer module 610 is further configured to report information of the first resource set to the higher layer module 620.

Therefore, the physical layer of the terminal device reports the determined first resource set for transmitting the target service to the higher layer, so that the higher layer of the terminal device can allocate resources to the terminal device or indicate it to perform operations such as resource reselection based on the report of the physical layer, thereby enabling the terminal device to obtain transmission resources for transmitting the target service when the available resources are insufficient for resource selection.

In an embodiment, the physical layer module 610 is specifically configured to: perform sensing in the first resource pool within the time interval [n+T1, n+T2] to obtain a second resource set, where, the total amount of resources in the first resource pool on the first carrier within the time interval [n+T1, n+T2] is A, and the amount of resources in the second resource set is B; if B/A is greater than or equal to a threshold Q, the physical layer module 610 performs detection on received signal strength indicator RSSI of the B resources in the second resource set, and takes P resources with smallest RSSI measurement value in the second resource set as the first resource set; and if B/A is lower than the threshold Q, the physical layer module 610 determines the second resource set as the first resource set.

In an embodiment, P is determined based on Q and A.

In an embodiment, the second resource set does not include resources occupied and/or reserved by a second terminal device, where the second terminal device is a terminal device using a first transmission mode, and the first terminal device is a terminal device using a second transmission mode.

In an embodiment, time-frequency resources used by the terminal device using the first transmission mode for performing service transmission are resources scheduled by a network device, and time-frequency resources used by the terminal device using the second transmission mode for performing service transmission are resources autonomously selected by the terminal device in a resource pool corresponding to the second transmission mode.

In an embodiment, the physical layer module 610 is specifically configured to report the resources in the first resource set to the higher layer module 620.

In an embodiment, the physical layer module 610 is specifically configured to report an insufficient resource indication to the higher layer module 620, where the insufficient resource indication is used to indicate that a ratio of B and A is lower than the threshold Q, where B is the amount of resources in the second resource set, and A is the total amount of resources in the first resource pool on the first carrier within the time interval [n+T1, n+T2].

In an embodiment, the higher layer module 620 is further configured to: determine, in the first resource set, a target resource for the first terminal device to transmit the target service; and send a first indication to the physical layer module 610, the first indication is used to indicate the target resource; and the physical layer module 610 is further configured to transmit the target service on the target resource according to the first indication.

In an embodiment, the higher layer module 620 is further configured to send a second indication to the physical layer module 610, where the second indication is used to indicate that the physical layer module 610 reselects a first resource set available for transmitting the target service in a second resource pool on the first carrier.

In an embodiment, the higher layer module 620 is further configured to: send a third indication to the physical layer module 610, where the third indication is used to indicate that the physical layer module 610 reselects a first resource set available for transmitting the target service in a third resource pool on a second carrier.

In an embodiment, the physical layer module 610 is further configured to: receive configuration information sent by the network device, where the configuration information is used to indicate the threshold Q; or acquire the threshold Q pre-stored in the first terminal device.

It should be understood that the terminal device 600 may perform corresponding operations of the method 400 performed by the first terminal device in the foregoing method embodiments. For brevity, details are not described herein again.

Figure 7:
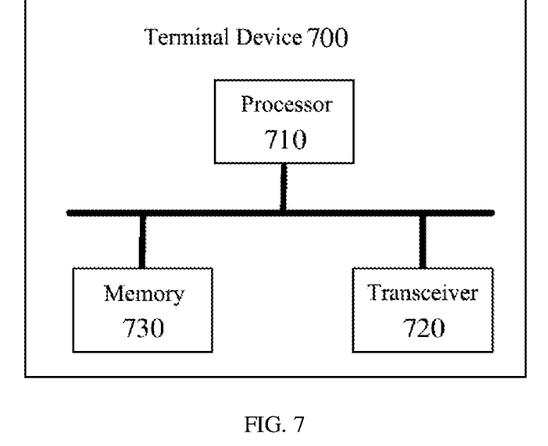
FIG. 7 is a schematic structural diagram of a terminal device according to an embodiment of the present disclosure.

FIG. 7 is a schematic structural diagram of a terminal device 700 according to an embodiment of the present disclosure. As shown in FIG. 7, the terminal device 700 includes a processor 710, a transceiver 720, and a memory 730. The processor 710, the transceiver 720, and the memory 730 communicate with each other through an internal connection path. The memory 730 is configured to store instructions, and the processor 710 is configured to execute instructions stored in the memory 730 to control the transceiver 720 to receive signals or send signals.

In an embodiment, the processor 710 may invoke program codes stored in the memory 730 to perform corresponding operations of the method 400 performed by the first terminal device in the method embodiments. For brevity, details are not described herein again.

It should be understood that the processor in the embodiment of the present disclosure may be an integrated circuit chip with signal processing capability. In an implementation process, each step of the above method embodiments may be completed by an integrated logic circuit of hardware in a processor or instructions in a form of software. The above processor may be a general-purpose processor, a digital signal processor (DSP), an application specific integrated circuit (ASIC), a field programmable gate array (FPGA), or other programmable logic devices, discrete gates or transistor logic devices, discrete hardware components. Various methods, steps, and logical block diagrams disclosed in the embodiments of the present disclosure may be implemented or executed. A general-purpose processor may be a microprocessor or the processor may be any conventional processor or the like. The steps in combination with the methods disclosed in the embodiments of the present disclosure may be directly embodied as performed by a hardware decoding processor, or may be performed by a combination of hardware and software modules in the decoding processor. The software module can be located in a conventional storage medium in the art such as random access memory, flash memory, read-only memory, programmable read-only memory, or electrically erasable programmable memory, register, or the like. The storage medium is located in the memory, and the processor reads information in the memory and combines its hardware to complete the steps of the above methods.

It can be understood that the memory in the embodiments of the present disclosure may be a volatile memory or a non-volatile memory, or may include both volatile and non-volatile memory. Where, the non-volatile memory may be a read-only memory (ROM), a programmable ROM (PROM), an erasable PROM (EPROM), an electrically EPROM (EEPROM) or flash memory. The volatile memory may be a random access memory (RAM), which is used as an external cache. By way of example but not limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM) and direct rambus RAM (DR RAM). It should be noted that the memory of the systems and methods described herein is intended to include, but is not limited to, these and any other suitable types of memory.

Figure 8:
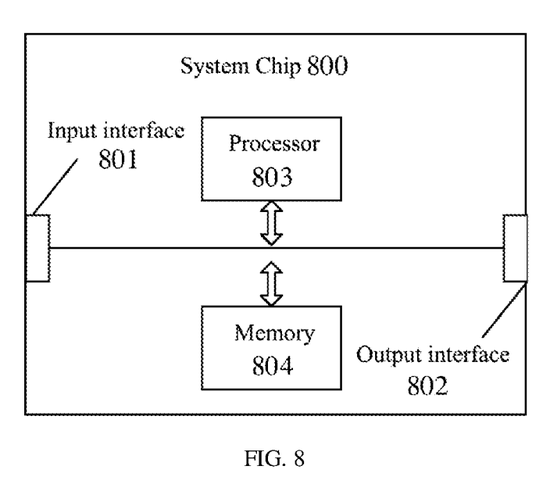
FIG. 8 is a schematic structural diagram of a system chip according to an embodiment of the present disclosure.

FIG. 8 is a schematic structural diagram of a system chip according to an embodiment of the present disclosure. The system chip 800 of FIG. 8 includes an input interface 801, an output interface 802, at least one processor 803, and a memory 804. The input interface 801, the output interface 802, the processor 803, and the memory 804 are connected to each other through an internal connection path. The processor 803 is configured to execute codes in the memory 804.

In an embodiment, when the codes are executed, the processor 803 may implement the method 400 performed by the first terminal device in the method embodiments. For brevity, details are not described herein again.

Those of ordinary skill in the art may appreciate that the units and algorithm steps of the various examples described in combination with the embodiments disclosed herein can be implemented by electronic hardware, or a combination of computer software and electronic hardware. Whether these functions are performed in hardware or software depends on specific applications and design constraints of the technical solutions. A person skilled in the art can use different methods to implement the described functions for each specific application, but such implementation should not be considered to be beyond the scope of the present disclosure.

A person skilled in the art can clearly understand that, for the convenience and brevity of description, the specific operation processes of the systems, devices, and units described above can refer to the corresponding processes in the foregoing method embodiments, details are not described herein again.

In the several embodiments provided in the present disclosure, it should be understood that the disclosed systems, devices, and methods may be implemented in other ways. For example, the device embodiments described above are merely illustrative. For example, the division of the unit is only a logical function division. In an actual implementation, there may be another division manner. For example, multiple units or components may be combined or may be integrated into another system, or some features can be ignored or not executed. In addition, the shown or discussed coupling or direct coupling or communication connection between each other may be an indirect coupling or communication connection through some interfaces, devices or units, and may be in electrical, mechanical or other forms.

The units described as separate components may or may not be physically separated, and the components displayed as units may or may not be physical units, that is, may be located in one place, or may be distributed to multiple network units. Some or all of the units may be selected according to actual needs to implement the purpose of the solution of the present embodiment.

In addition, each functional unit in each embodiment of the present disclosure may be integrated into one monitoring unit, or each unit may exist physically separately, or two or more units may be integrated into one unit.

This functionality, if implemented as a software functional unit and sold or used as a standalone product, can be stored in a computer readable storage medium. Based on such understanding, the technical solution of the present disclosure essentially, or a part of contributing to the prior art, or a part of the technical solution, may be embodied in a form of a software product, the computer software product is stored in a storage medium, which includes a number of instructions for causing a computer device (which may be a personal computer, server, or network device, or the like) to perform all or part of the steps of various embodiments of the present disclosure. The foregoing storage medium includes various medium that can store program codes: a U disk, a mobile hard disk, a read-only memory (ROM), a random access memory (RAM), a magnetic disk, or an optical disk, or the like.

The above mentioned are only specific implementations of the present disclosure, but the protection scope of the present disclosure is not limited thereto. Any person skilled in the art can easily think of changes or substitutions within the technical scope disclosed in the present disclosure, which should be covered in the protection scope of the present disclosure. Therefore, the protection scope of the present disclosure should be determined by the protection scope of the claims.

What is claimed is:

1. A method for resource selection in device-to-device (D2D) communication, wherein, the method comprises:
    performing, by a physical layer of a first terminal device, sensing in a first resource pool on a first carrier within a time interval [n+T1, n+T2] to obtain a first resource set, and resources in the first resource set can be used for the first terminal device to transmit a target service, wherein n is a time when the target service arrives, or a time when the first terminal device determines that performing sensing is required, 0≤T1<T2; and
    reporting, by the physical layer of the first terminal device, information of the first resource set to a higher layer of the first terminal device;
    wherein, the reporting, by the physical layer of the first terminal device, information of the first resource set to a higher layer of the first terminal device, comprises:
    reporting, by the physical layer of the first terminal device, an insufficient resource indication to the higher layer of the first terminal device;
    wherein the performing, by a physical layer of a first terminal device, sensing in a first resource pool on a first carrier within a time interval [n+T1, n+T2] to obtain a first resource set, comprises:
    performing, by the physical layer of the first terminal device, sensing in the first resource pool within the time interval [n+T1, n+T2] to obtain a second resource set, wherein the total amount of resources in the first resource pool on the first carrier within the time interval [n+T1, n+T2] is A, and the amount of resources in the second resource set is B;
    performing, by the physical layer of the first terminal device, measurement of received signal strength indicator (RSSI) of B resources in the second resource set if B/A is greater than or equal to a threshold Q, and taking P resources with the smallest RSSI measurement value in the second resource set as the first resource set; and
    determining, by the physical layer of the first terminal device, the second resource set as the first resource set if B/A is lower than the threshold Q;
    wherein the second resource set does not comprise resources occupied and/or reserved by a second terminal device, wherein the second terminal device is a terminal device using a first transmission mode, and the first terminal device is a terminal device using a second transmission mode;
    wherein time-frequency resources used by a terminal device using the first transmission mode for service transmission are resources scheduled by a network device; time-frequency resources used by a terminal device using the second transmission mode for service transmission are resources autonomously selected from a resource pool corresponding to the second transmission mode by the terminal device using the second transmission mode.

2. The method according to claim 1, wherein, P is determined according to Q and A.

3. The method according to claim 1, wherein, the reporting, by the physical layer of the first terminal device, information of the first resource set to a higher layer of the first terminal device, comprises:
    reporting, by the physical layer of the first terminal device, resources in the first resource set to the higher layer of the first terminal device.

4. The method according to claim 1, wherein the insufficient resource indication is used to indicate that a ratio of B and A is lower than the threshold Q, wherein B is the amount of resources in the second resource set, and A is the total amount of resources in the first resource pool on the first carrier within the time interval [n+T1, n+T2].

5. The method according to claim 1, wherein, the method further comprises:
    determining, by the higher layer of the first terminal device, in the first resource set, a target resource for the first terminal device to transmit the target service;
    sending, by the higher layer of the first terminal device, a first indication to the physical layer of the first terminal device, wherein the first indication is used to indicate the target resource; and
    transmitting, by the physical layer of the first terminal device, the target service on the target resource according to the first indication.

6. The method according to claim 1, wherein, the method further comprises:
    sending, by the higher layer of the first terminal device, a second indication to the physical layer of the first terminal device, wherein the second indication is used to indicate the physical layer of the first terminal device to reselect a first resource set available for transmitting the target service in a second resource pool on the first carrier; or
    sending, by the higher layer of the first terminal device, a third indication to the physical layer of the first terminal device, wherein the third indication is used to indicate the physical layer of the first terminal device to reselect a first resource set available for transmitting the target service in a third resource pool on a second carrier.

7. The method according to claim 1, wherein, before the performing, by the physical layer of the first terminal device, sensing in the first resource pool within the time interval [n+T1, n+T2] to obtain a second resource set, the method further comprises:
    receiving, by the first terminal device, configuration information sent by the network device, wherein the configuration information is used to indicate the threshold Q; or
    acquiring, by the first terminal device, the threshold Q pre-stored in the first terminal device.

8. A terminal device, wherein, the terminal device is a first terminal device comprising a processor, a transceiver, and a memory, wherein, the memory is stored with instructions, and the processor is configured to enable the first terminal device to perform following steps when running the instructions:

performing, by a physical layer of the first terminal device, sensing in a first resource pool on a first carrier within a time interval [n+T1, n+T2] to obtain a first resource set, and resources in the first resource set can be used for the first terminal device to transmit a target service, wherein n is a time when the target service arrives, or a time when the first terminal device determines that performing sensing is required, 0≤T1<T2;

reporting, by the physical layer of the first terminal device, information of the first resource set to a higher layer of the first terminal device;

wherein, the processor is configured to enable the first terminal device to perform following steps when running the instructions:

reporting, by the physical layer of the first terminal device, an insufficient resource indication to the higher layer of the first terminal device;

wherein, the processor is configured to enable the first terminal device to perform following steps when running the instructions:

performing, by the Physical layer of the first terminal device, sensing in the first resource pool within the time interval [n+T1, n+T2] to obtain a second resource set, wherein the total amount of resources in the first resource pool on the first carrier within the time interval [n+T1, n+T2] is A, and the amount of resources in the second resource set is B;

performing, by the physical layer of the first terminal device, detection on received signal strength indicator (RSSI) of B resources in the second resource set if B/A is greater than or equal to a threshold Q, and take P resources with smallest RSSI measurement value in the second resource set as the first resource set; and     determining, by the physical layer of the first terminal device, the second resource set as the first resource set if B/A is lower than the threshold Q;

wherein the second resource set does not comprise resources occupied and/or reserved by a second terminal device, wherein the second terminal device is a terminal device using a first transmission mode, and the first terminal device is a terminal device using a second transmission mode;

wherein time-frequency resources used by a terminal device using the first transmission mode for service transmission are resources scheduled by a network device, and time-frequency resources used by a terminal device using the second transmission mode for service transmission are resources autonomously selected from a resource pool corresponding to the second transmission mode by the terminal device using the second transmission mode.

9. The terminal device according to claim 8, wherein, P is determined according to Q and A.

10. The terminal device according to claim 8, wherein, the processor is configured to enable the first terminal device to perform following steps when running the instructions:

reporting, by the physical layer of the first terminal device, resources in the first resource set to the higher layer.

11. The terminal device according to claim 8, wherein the insufficient resource indication is used to indicate that a ratio of B and A is lower than the threshold Q, wherein B is the amount of resources in the second resource set, and A is the total amount of resources in the first resource pool on the first carrier within the time interval [n+T1, n+T2].

12. The terminal device according to claim 8, wherein, the processor is further configured to enable the first terminal device to perform following steps when running the instructions:

determining, by the higher layer of the first terminal device, in the first resource set, a target resource for the first terminal device to transmit the target service;

sending, by the higher layer of the first terminal device, a first indication to the physical layer of the first terminal device, wherein the first indication is used to indicate the target resource; and     the processor is further configured to enable the first terminal device to perform following steps when running the instructions:

transmitting, by the physical layer of the first terminal device, the target service on the target resource according to the first indication.

13. The terminal device according to claim 8, wherein, the processor is further configured to enable the first terminal device to perform following steps when running the instructions:

sending, by the higher layer of the first terminal device, a second indication to the physical layer of the first terminal device, wherein the second indication is used to indicate the physical layer of the first terminal device to reselect a first resource set available for transmitting the target service in a second resource pool on the first carrier; or     sending, by the higher layer of the first terminal device, a third indication to the physical layer of the first terminal device, wherein the third indication is used to indicate the physical layer of the first terminal device to reselect a first resource set available for transmitting the target service in a third resource pool on a second carrier.

14. The terminal device according to claim 8, wherein the processor is further configured to enable the first terminal device to perform following steps when running the instructions:

receiving configuration information sent by a network device, wherein the configuration information is used to indicate the threshold Q; or acquiring the threshold Q pre-stored in the first terminal device.

\* \* \* \* \*